United States Patent [19]
Cai et al.

[11] Patent Number: 5,757,491
[45] Date of Patent: May 26, 1998

[54] LASER INTERFEROMETER SYSTEM FOR STRAIGHTNESS MEASUREMENTS

[75] Inventors: Lilong Cai; Jihua Zhang, both of Hong Kong, Hong Kong

[73] Assignee: The Hong Kong University of Science & Technology, Hong Kong, Hong Kong

[21] Appl. No.: 699,348

[22] Filed: Aug. 19, 1996

[51] Int. Cl.6 ............................................. G01B 9/02
[52] U.S. Cl. ............................... 356/358; 356/361
[58] Field of Search ............................ 356/358, 361, 356/345

[56] References Cited

U.S. PATENT DOCUMENTS

| | | |
|---|---|---|
| 3,409,375 | 11/1968 | Hubbard ............................. 356/358 |
| 3,790,284 | 2/1974 | Baldwin . |
| 4,787,747 | 11/1988 | Sommargren et al. . |
| 5,026,163 | 6/1991 | McMurtry et al. . |
| 5,337,145 | 8/1994 | Chaney . |
| 5,521,704 | 5/1996 | Thiel et al. ........................... 356/358 |
| 5,585,922 | 12/1996 | Sueyoshi ............................. 356/358 |

*Primary Examiner*—Frank G. Font
*Assistant Examiner*—Robert Kim
*Attorney, Agent, or Firm*—Burns, Doane, Swecker & Mathis, L.L.P.

[57] ABSTRACT

A laser interferometer system in particular for measuring the straightness of an object is described. This interferometer employs triangular prisms to refract the laser beams by certain angles with respect to the principal axis of the incident beam. Two configurations are described. One is for high accuracy in short range measurements, the other can handle long range measurements with high resolution that is not related to the range. For the latter the interferometer comprises a laser source, a beam splitter, a plane reflector, two first triangular prisms, a second prism, a right angle prism reflector and a detector system. The second prism and the right-angle prism reflector are integrated into one body to form a movable component and are attached to the object to be measured.

27 Claims, 10 Drawing Sheets

LASER INTERFEROMETER SYSTEM FOR STRAIGHTNESS MEASUREMENTS

BACKGROUND OF THE INVENTION

1. Field of the Invention

The present invention relates to a laser interferometer system. In particular the invention relates to a laser interferometer system for measuring the straightness of an object. However, the invention is also suitable for high accuracy transverse vibration monitoring and for servo control systems. The main applications of the system are in the fields of metrology, control, alignment techniques, precision engineering and manufacturing.

2. Description of the Related Art

Figure 1:
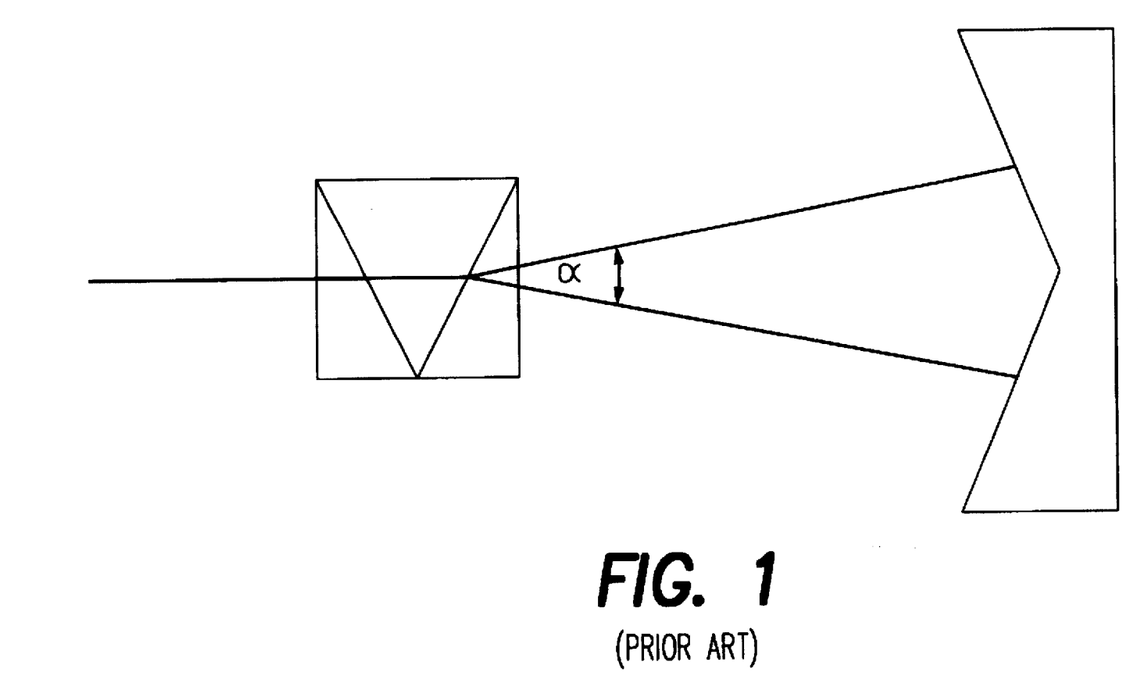
FIG. 1 is a diagrammatic view of a prior art straightness interferometer system.

In a typical prior art system (for example as manufactured by Hewlett-Packard and described in U.S. Pat. No. 3,790,284) shown in FIG. 1, a Wollaston prism is used to split a laser beam travelling along a principal axis into two secondary beams. The two secondary beams deviate from the principal axis by equal angle α, and travel to a straightness reflector. The straightness reflector reflects the secondary beams back along their respective paths. The two returned beams combine in the Wollaston prism along the principal axis. A detector system receives the interference fringes caused by the optical path lengths difference of the combined beam. The measuring signals are produced when a transverse movement takes place between the Wollaston prism and the straightness reflector. The optical path lengths difference Δ caused by a transverse movement x can be expressed as $$\Delta = 2x\sin(\alpha/2). \tag{1}$$

The optical resolution of an interferometer system for straightness measurement is characterized by the ratio Δ/x. The range of an interferometer for straightness measurement refers to the measurable range of the interferometer along the principal axis.

In U.S. Pat. No. 5,026,163, a compensated Rochon prism is used to split a laser beam into two secondary beams. One of the secondary beams is undeviated and remains on the principal beam axis while the other secondary beam is deviated by a small angle from the principal beam axis.

A relative movement between the laser source and the interference prisms will cause a measuring error. To resolve this problem, U.S. Pat. No. 5,337,145 discloses a method which combines a cold light source together with a straightness linked to a remote laser by a fibre optical cable. Another example of a prior art system is to be found in U.S. Pat. No. 4,787,747.

The systems mentioned above have certain disadvantages. Firstly, they all require a single beam to be split into two divergent secondary beams and the resolution and the range of the respective interferometers are limited by the angular deviation of the secondary beams. For example, to achieve a larger range the angular deviation should be very small which results in a lower optical resolution. Also a larger range or a larger angular deviation requires a larger size of straightness reflector. Secondly, the Wollaston prism or Rochon prism has to be accurately paired with the straightness reflector, which makes them expensive. Thirdly, the straightness reflectors have to be accurately aligned with the Wollaston prism to ensure that the reflected beams re-combine in the prism.

The present invention provides triangular prisms to deviate secondary beams by an angle from the principal beam axis. One of its advantages is that since the optical path difference of the two beams is not only related to the angle of the prisms but also the refractive index of the prisms, a higher optical sensitivity can be obtained. More particularly, by changing the initial setting of the prisms and the laser source, the range is no longer limited by the device but by the interference length of the laser, meanwhile a high measurement resolution can be obtained. For example, to measure a longer range up to 40 meters, the deviation angle α in the prior art may have to be reduced down to 0.1°, but in the present invention, the angle α of the prisms can be selected freely. If we choose the α angle to be 25°, the optical resolution of present invention can be improved one hundred fold. In addition, the returned beams are insensitive to pitching movements and less sensitive to yawing movements of the movable component. Thus alignment of the components of the interferometer is easier.

SUMMARY OF THE INVENTION

According to an embodiment of the invention there is provided a laser interferometer system comprising:

- a frequency stabilised laser source for producing a laser beam along a principal axis;

- a first component including, beam splitting means for producing two measuring arms, reflecting means for reflecting one of said measuring arms such that said measuring arms are parallel, and a pair of first prisms located respectively in the optical paths of said measuring arms and comprising refractive surfaces and reflection surfaces;

- a second component including a pair of prism reflectors located respectively in the optical paths of said measuring arms, at least one of said prism reflectors including a refraction surface, whereby said prism reflectors direct said measuring arms back to said reflection surfaces of said first prisms whereupon said measuring arms are reversed and recombined in said beam splitting means into a combined beam carrying information relating to the optical path difference between said two measuring arms;

- and detection means for receiving said re-combined beam.

In one embodiment a first of the prism reflectors comprises reflection surfaces only while the second of the prism reflectors comprises at least one refractive surface whereby upon transverse movement of the second component normal to the measuring arms an optical path difference is introduced into the measuring arm incident on the second of said prism reflectors.

Alternatively both the prism reflectors may include refractive surfaces arranged so as to refract the measuring arms in opposite senses, ie so that the measuring arms either converge or diverge. In such an embodiment the first triangular prisms are arranged so as to generate respectively diverging or converging measuring arms.

Viewed from another aspect the present invention provides a laser interferometer system:

- a frequency stabilised laser source for producing a laser beam along a principal axis;

- a first component including beam splitting means for producing two measuring arms, reflecting means for reflecting one of said measuring arms such that said measuring arms are parallel, and a pair of first triangular prisms located respectively in the optical paths of said measuring arms and comprising refractive surfaces and reflection surfaces and arranged to refract said

3 measuring arms by identical amounts whereby said measuring arms remain parallel;

a second component including a reflection means located in one of said measuring arms and a prism reflector including a refractive surface located in the other of said measuring arms whereby said reflection means and said prism reflector direct said measuring arms back to said reflection surfaces of said first triangular prisms whereupon said measuring arms are reversed and recombined in said beam splitting means into a combined beam carrying information relating to the optical path difference between said two measuring arms;

and detection means for receiving said re-combined beam.

Viewed from a further aspect the present invention provided a laser interferometer system comprising:

a frequency stabilised laser source for producing a laser beam along a principal axis;

a first component including beam splitting means for producing two measuring arms, reflecting means for reflecting one of said measuring arms such that said measuring arms are parallel, and a pair of first triangular prisms located respectively in the optical paths of said measuring arms and comprising refractive surfaces and reflection surfaces and wherein said first triangular prisms are arranged so as to cause said measuring arms to converge after passing therethrough;

a second component including a pair of prism reflectors located respectively in the optical paths of said measuring arms whereby said prism reflectors direct said measuring arms back to said reflection surfaces of said first triangular prisms whereupon said measuring arms are reversed and recombined in said beam splitting means into a combined beam carrying information relating to the optical path difference between said two measuring arms;

and detection means for receiving said re-combined beam.

Viewed from a still further aspect the present invention provides a laser interferometer system comprising:

a frequency stabilised laser source for producing a laser beam along a principal axis;

a first component including, beam splitting means for producing two measuring arms, reflecting means for reflecting one of said measuring arms such that said measuring arms are parallel, and a pair of first triangular prisms located respectively in the optical paths of said measuring arms and comprising refractive surfaces and reflection surfaces and wherein said first triangular prisms are arranged so as to cause said measuring arms to diverge after passing therethrough;

a second component including a pair of prism reflectors located respectively in the optical paths of said measuring arms whereby said prism reflectors direct said measuring arms back to said reflection surfaces of said first triangular prisms whereupon said measuring arms are reversed and recombined in said beam splitting means into a combined beam carrying information relating to the optical path difference between said two measuring arms;

and detection means for receiving said re-combined beam.

Viewed from a still further aspect the present invention provides a laser interferometer system comprising:

a frequency stabilised laser source for producing a laser beam along a principal axis;

4 means for splitting said laser beam into two parallel measuring arms;

means for introducing an optical path difference between said measuring arms upon movement of said optical path difference introducing means with a component perpendicular to said measuring arms;

means for recombining said measuring arms into a combined beam;

and detection means for receiving said recombined beam.

The advantages of the present invention are: (1) The system involves only three optical components, making alignment easy. (2) Since the second prism is just like a retro-reflector, the directions of returning beams are less sensitive to the pitch errors and yaw errors. (3) Any vibration or drift which results in relative movement between the source and the other two components will cause an equal optical path length change between the two measuring arms of beams, therefore the measuring accuracy is not affected. (4) The interferometer possesses unlimited range and a high optical resolution as well.

BRIEF DESCRIPTION OF THE DRAWINGS

Some embodiments of the invention will now be described by way of example and with reference to the accompanying drawings, in which.

DESCRIPTION OF THE PREFERRED EMBODIMENTS

Figure 2:
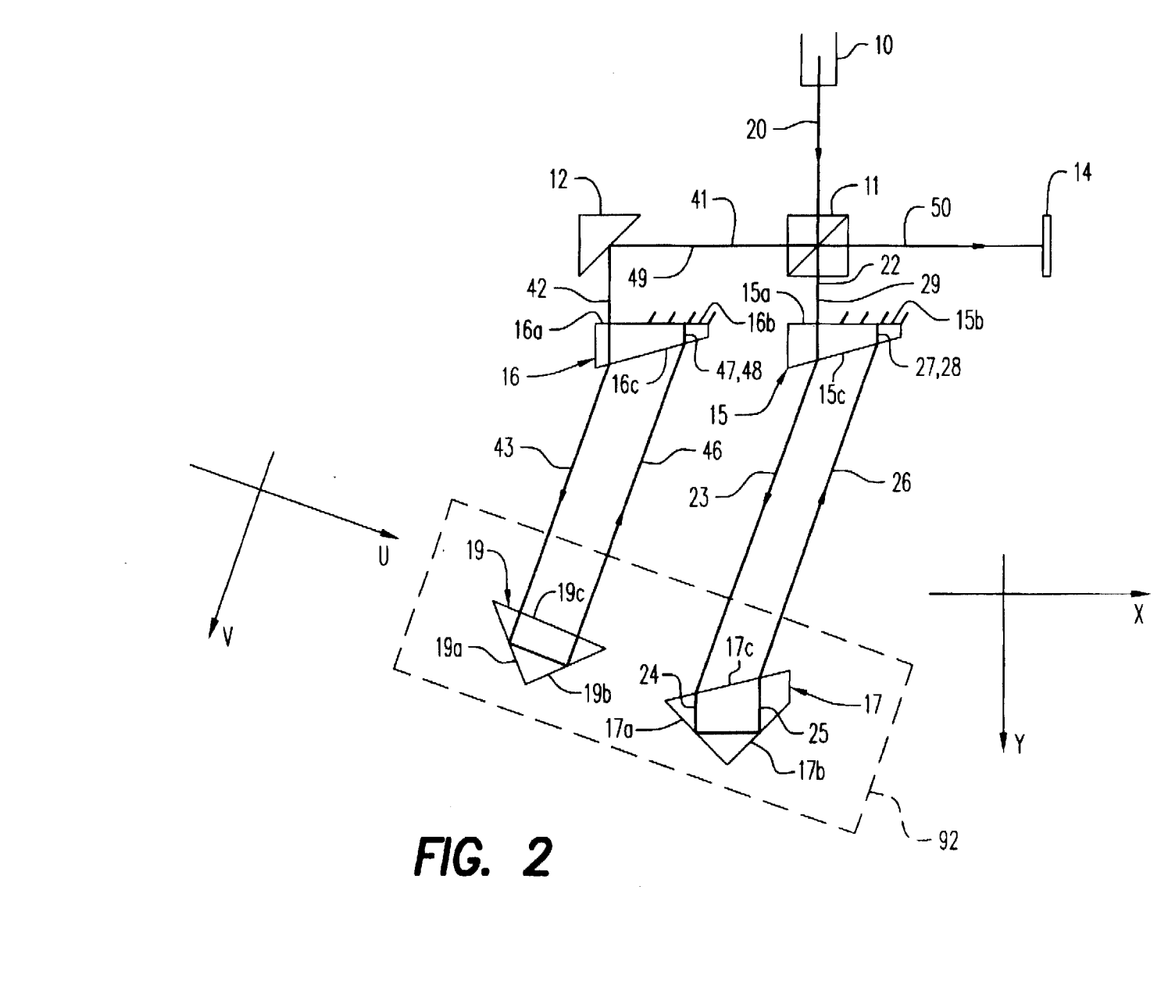
FIG. 2 is a diagrammatic view of the straightness interferometer system of one embodiment of the invention.

FIG. 2 is a diagrammatic view of an embodiment of a straightness interferometer system using the interference triangular prisms of the present invention. The system includes a laser 10 which provides a beam 20 along the Y axis. The beam is split by a polarizing cube beam splitter 11 into two orthogonal measuring beams 22 and 41. One of the beams 22 remains on the Y axis while the other beam 41 is reflected by the reflector 12 to become beam 42 which is deviated by a certain distance from the Y axis. Two first triangular prisms 15, 16 are placed in the paths of the beams 22, 42. The beams transmit through the parts of surfaces 15a, 16a and undergo refraction at the hypotenuse surfaces 15c, 16c of the first triangular prisms forming the beams 23, 43 which are deviated at an equal angle from the Y axis and are parallel to each other.

In one measuring arm, beam 23 along the V axis is incident to a second prism 17, undergoes refraction at the hypotenuse surface 17c and is rendered parallel to beam 22 to become beam 24. Beam 24 is reflected by the right angle faces 17a, 17b to become beam 25. Beam 25 undergoes the refraction at the hypotenuse surface 17c again and is rendered parallel to beam 23 to become beam 26. Beam 26 re-enters the first triangular prism 15 and is rendered parallel to beam 22 to become beam 27. Beam 27 is orthogonally incident on the reflection surface 15b whereby it is reflected to become beam 28. Beam 28 returns back along the reverse direction of the beams 27, 26, 25, 24, 23, 22 to become beam 29.

In another measuring arm, beam 43 along the V axis is orthogonally incident on a right-angle prism reflector 19. Then the beam is reflected by the right angle faces 19a, 19b to become beam 46. Beam 46 re-enters the first triangular prism 16 and is rendered parallel to beam 42 to become beam 47. Beam 47 is orthogonally incident to the reflection surface 13b whereby it is reflected to become beam 48. Beam 48 returns back along the reverse direction of the beams 47, 46, 43, 42 to become beam 49.

The two returned beams 29, 49 are combined in the cube beam splitter 11 to become beam 50. A detector system 14 is positioned in the path of beam 50 to detect the interference fringes.

Figure 3A:
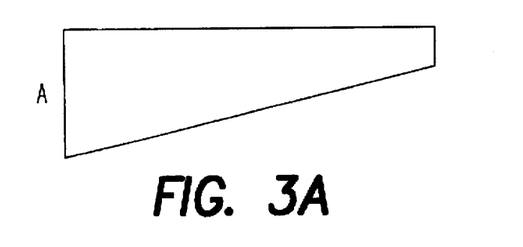
FIG. 3 shows front and top views of a first triangular prism.
Figure 3B:
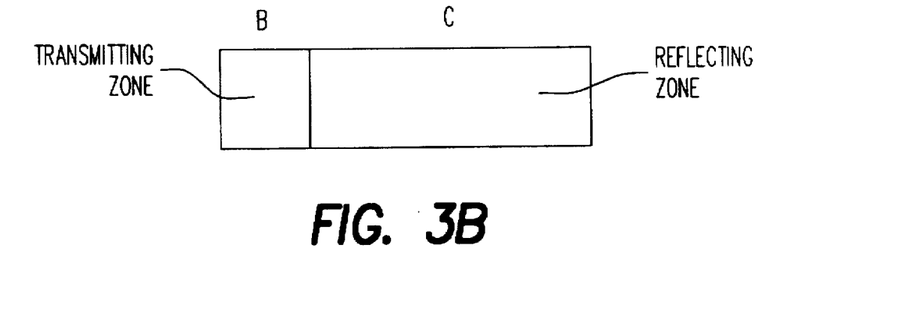
Figure 4A:
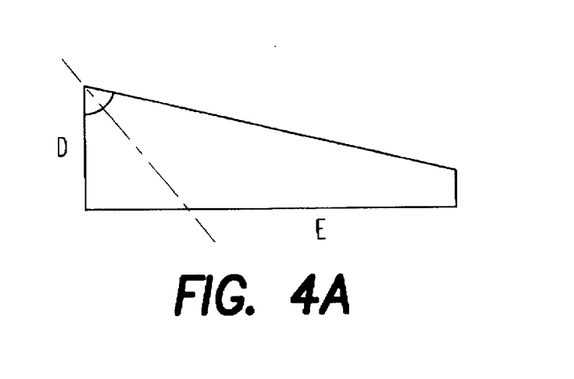
FIG. 4 shows front and top views of a second prism.
Figure 4B:
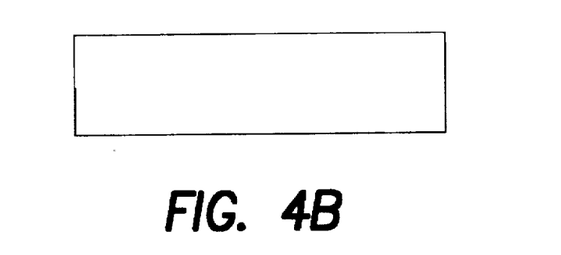

FIG. 3 shows a first triangular prism 15, 16 with an oblique angle $\alpha$ has both a transmitting zone and a reflecting zone. On the top surface of the first triangular prisms one part of the surface is coated with anti-reflection coating and the other part of the surface is coated with reflection coating. FIG. 4 shows the second prism 17 with an oblique angle of $45°+\alpha$. Both of its right angle faces are coated with a reflection coating. The first triangular prism and the second prism are relatively orientated so that their hypotenuse surfaces 15c, 17c are parallel to each other. In this case the second prism may be considered as a combination of a triangular prism 93 and a retroreflector 94 shown in FIG. 5. It may also be considered as a right-angle prism reflector with one of the oblique angles being $45°+\alpha$ and another angle being $45°-\alpha$.

It may also be observed that throughout this specification the term "triangular" applies not only to prisms that are literally triangular in shape. For example, as shown in FIGS. 3 & 4 an acute angle of the triangle may be cut off to simplify manufacturing leaving a four-sided prism. Such prisms are considered to be within the term "triangular".

Figure 6:
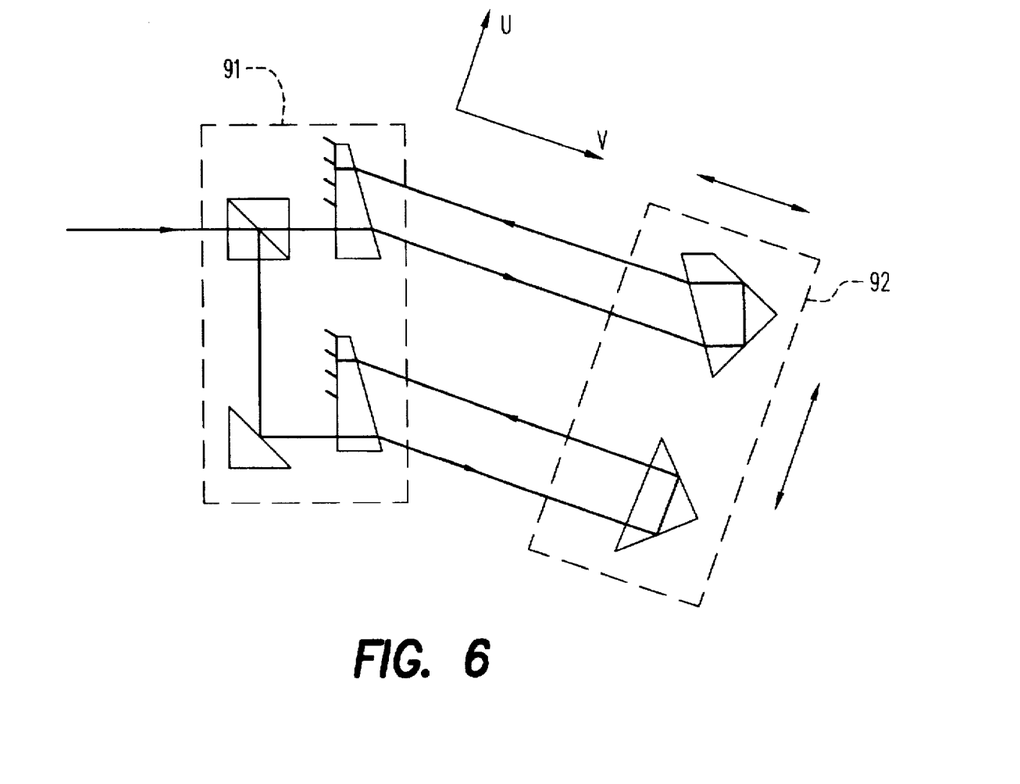
FIG. 6 is a view of a simplification of the embodiment of FIG. 2.

In real measurements, the components of a cube beam splitter 11, a reflector 12, and two first triangular prisms 15, 16 can be integrated into a fixed component 91 and mounted on a fixed base. Possibly the detector system 14 could also be formed as part of the fixed component 91. The second prism 17 and the right angle prism reflector 19 can be integrated into a single movable component 92 and mounted on the objective to be measured. Such an arrangement is shown in FIG. 6. The range of the interferometer is unlimited when the movable component travels along the principal V axis as the size of the components in the interferometer no longer affects the range of the interferometer.

When the movable component 92 travels along the V axis, the optical path lengths difference between the two measuring arms remains unchanged. But as will be explained below with reference to FIG. 7 a relative transverse movement along the U axis will increase or decrease the optical path length in one measuring arm, meanwhile the optical path length remains unchanged in the other measuring arm. Therefore, the interference fringes are produced by the optical path lengths difference of the two measuring beams as the relative transverse movements along the U axis take place; meanwhile the movable component travels along the V axis. The detector system produces signals in known manner from the interference fringes.

Figure 7:
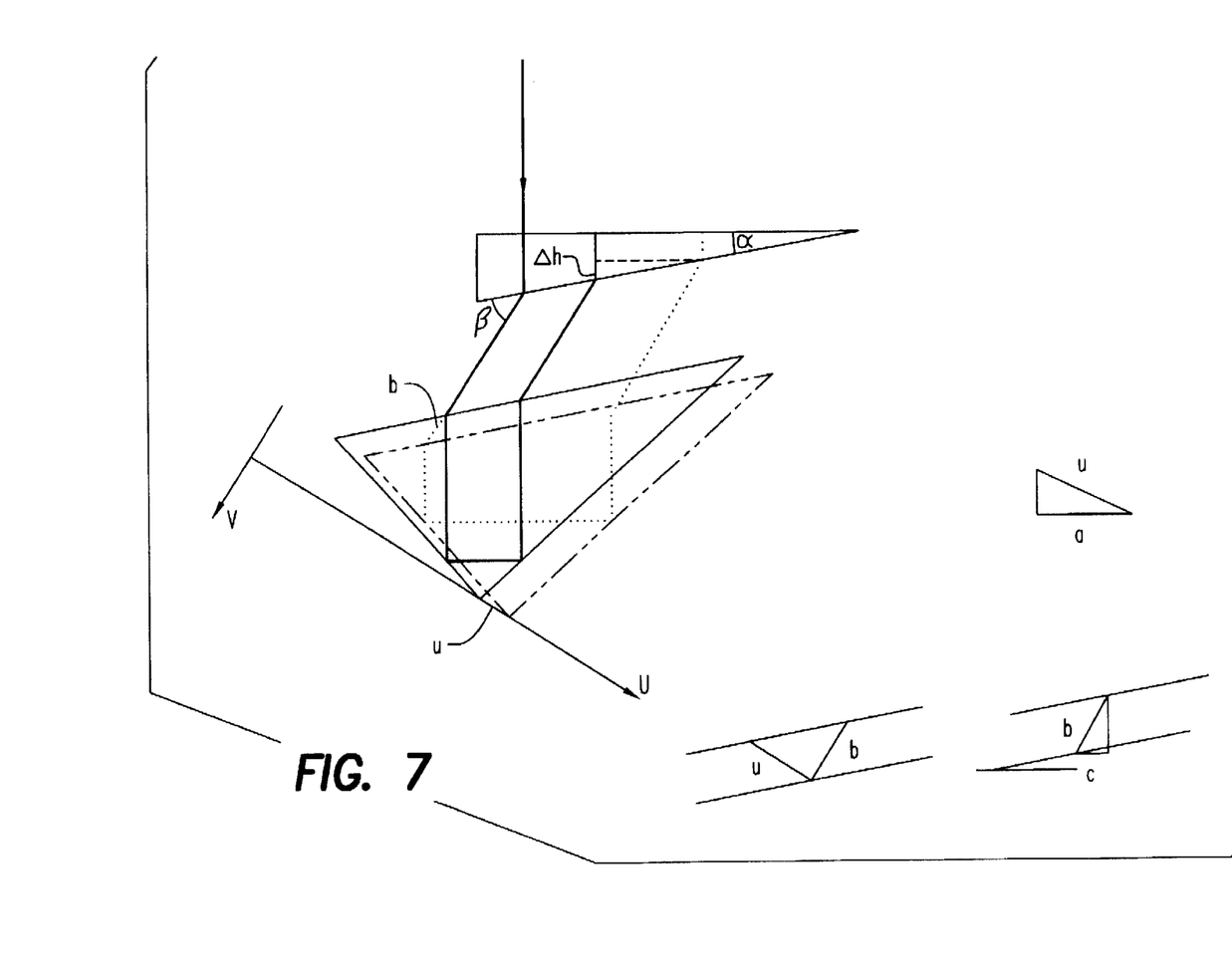
FIG. 7 is a view of one arm of the optical path arrangement in FIG. 2 for calculating the optical path length change caused by a relative transverse displacement between the two triangular prisms.

FIG. 7 shows one arm of the optical path arrangement in FIG. 2 for calculating the change in optical path length caused by a relative transverse displacement between the fixed component and the movable component. The second prism is moved along the U axis by a small distance u, which causes the optical path length to change by a distance b in the air and a height difference $\Delta h$ in the first triangular prism. The relation between a transverse motion u and an optical path length change $\Delta$ can be derived as follows:

$$n \sin\alpha = \cos\beta \qquad (2)$$

$$b = u\cot\beta \qquad (3)$$

$$a = u\sin(\alpha+\beta) \qquad (4)$$

$$c = b\cos(\alpha+\beta) \qquad (5)$$

$$\Delta h = 2(a-c)\tan\alpha \qquad (6)$$

$$\Delta = 2(n\Delta h - 2b) = 4 n u \tan\alpha[\sin(\alpha+\beta) - \cot\beta\cos(\alpha+\beta)] - 4u\cot\beta, \qquad (7)$$

where n is the index of refraction of the first and second prisms, and $\beta$ is the angle between the V axis and the hypotenuse of the first triangular prism.

Because the optical path length remains unchanged in the other measuring arm, the optical path lengths difference between the two measuring beams will be $\Delta$.

Figure 5:
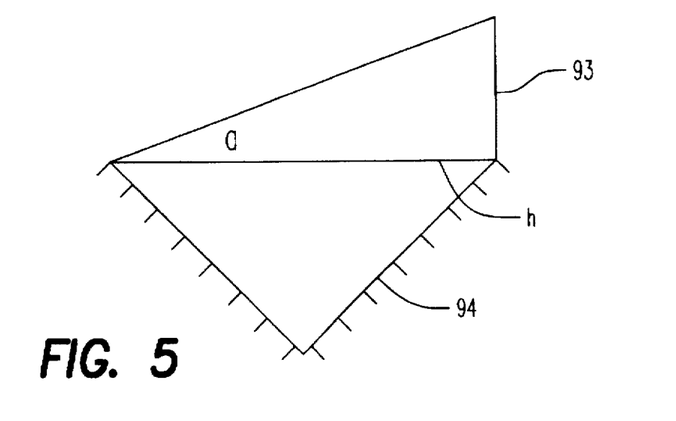
FIG. 5 is a plan view of a second prism that can be divided into a triangular prism and a retroreflector.

The maximum transverse measurement range $U_{max}$ is determined by the following equation:

$$U_{max} = h/2[\sin(\alpha+\beta) - \cot\beta\cos(\alpha+\beta)] \qquad (8)$$

where h is the equivalent length of the second prism shown in FIG. 5.

Figure 8:
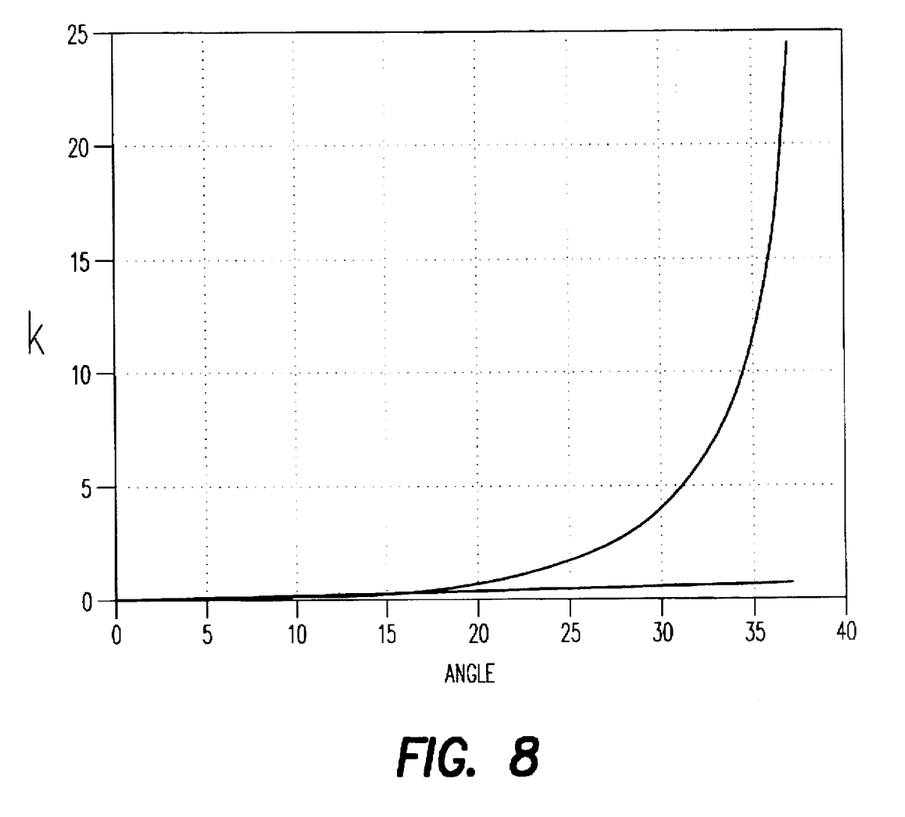
FIG. 8 shows the graph of coefficient k varying with $\alpha$ angle.

According to equation (7), for $n=1.65$ and $\alpha=25°$, the optical path length change $\Delta$ caused by the relative transverse displacement x can be expressed by: $\Delta=1.97x$. The maximum transverse measurement range $U_{max}$ can be expressed by: $U_{max}=h/2.2$. We can define $\Delta=kx$. k is related to the a angle of prisms. FIG. 8 shows the graph of coefficient k varying with $\alpha$ angle. The curve 1 is calculated according to equation (7), and the curve 2 is calculated according to equation (1). Compared with curve 2, curve 1 shows an evident improvement in the optical resolution of the interferometer when a larger angle is selected. Especially, for longer range measurements up to 40 meters, the deviation angle $\alpha$ in the prior art may be reduced down to 0.1 degree, which results in $k=0.002$. Comparing $k=1.97$ of the present invention and $k=0.002$ of the prior art, we can draw conclusion that the optical resolution of present invention can be improved as high as several hundred times.

A detailed list of specifications for particular examples of the prisms, including dimensions and quality requirements, is given in Table 1. For better performance, the prisms should be made in pairs so that they have similar characteristics.

TABLE 1

Specifications of the prisms (cf. FIGS. 3 & 4)

| | |
|---|---|
| Dimensions: | A = 15 mm, B = 8 mm, C = 22 mm, D = 20 mm, E = 50 mm |
| Dimension Tolerance: | +/− 0.1 mm |
| Angle alpha: | 25°, 70° |
| Angle Tolerance: | +/− 1 arcmin |
| Refractive Index n: | 1.65 |
| Wavelength lambda: | 632.8 nm |
| Surface Flatness: | lambda /4 at 632.8 nm over 90% of edge dimension |
| Material: | ZF2 grade A fine annealed |
| Surface Quality: | 60–40 scratch and dig |
| Coating: | Antireflection coating on the entrance faces for <1% reflectance per surface |

Now we can describe some of advantages of the present invention: (1) The system involves only three optical components, making alignment relatively easy. (2) Since the second prism is just like a retro-reflector, the directions of the returning beams are less sensitive to the pitch errors and yaw errors. (3) Any vibration or drift which results in a relative movement between the source and the other two components will cause an equal optical path length change between two measuring arms, and therefore the measuring accuracy is not affected. (4) The interferometer possesses effectively unlimited range with a high optical resolution.

We can improve the accuracy at the expense of reducing the range by using a differential method.

Figure 9:
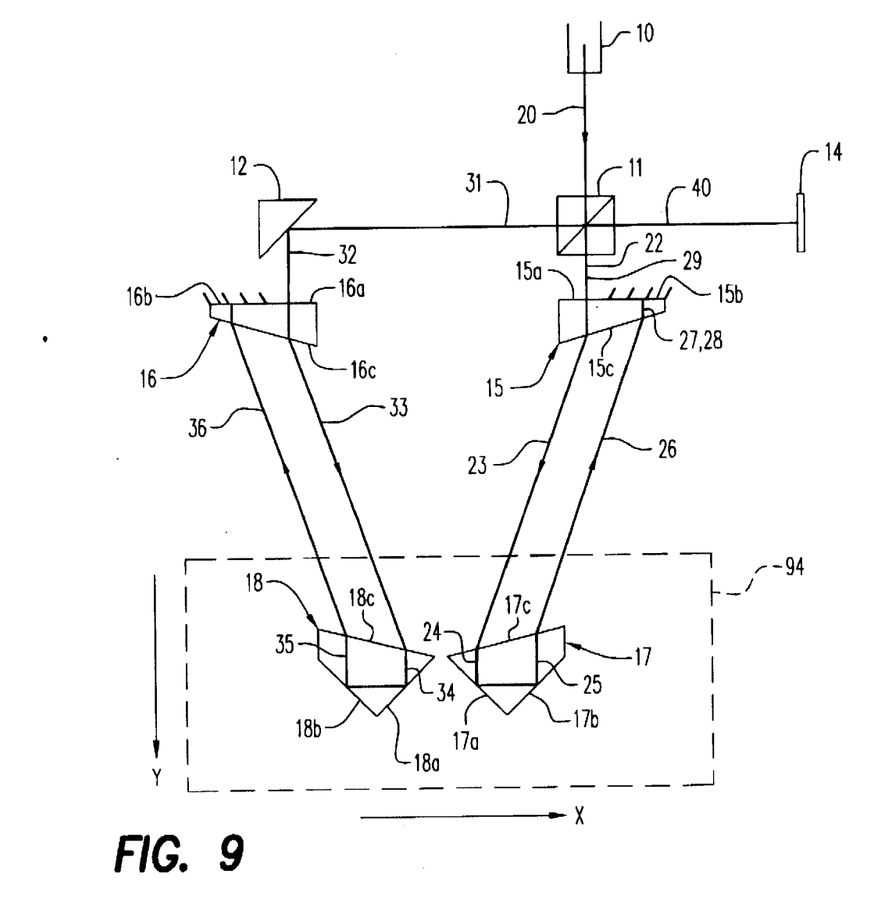
FIG. 9 is a diagrammatic view of one embodiment of a straightness interferometer system using differential interference triangular prisms.

FIG. 9 is a diagrammatic view of a differential straightness interferometer system according to a second embodiment of the present invention. The system includes a laser 10 which provides a beam 20 along the Y axis. The beam is split by a polarizing cube beam splitter 11 into two orthogonal beams 22 and 31. One of the beams 22 remains on the Y axis while another beam 31 is reflected by a reflector 12 to become beam 32 which is deviated by a given distance from the Y axis. Two first triangular prisms 15, 16 are placed in the paths of the beams 22, 32. The beams transmit through the areas of surfaces 15a, 16a and undergo refraction at the hypotenuse surfaces 15c, 16c of the first triangular prisms forming the beams 23, 33 which are deviated at opposing but identical angles from the Y axis so that they converge towards the second prisms.

In both the measuring arms, beams 23, 33 are incident on two second prisms 17, 18, undergo refraction at the hypotenuse surfaces 17c, 18c and are rendered parallel to beams 22, 32 to become beams 24, 34 respectively. Beams 24, 34 are reflected by the right angle faces 17a, 17b and 18a, 18b to become beams 25, 35. Beams 25, 35 undergo refraction at the hypotenuse surfaces 17c, 18c again and are rendered parallel to beams 23, 33 to become beams 26, 36. Beams 26, 36 re-enter the first triangular prisms 15, 16 and are rendered parallel to beams 22, 32 to become beams 27, 37. Beams 27, 37 are orthogonally incident on surfaces 15b, 16b whereby they are reflected to become beams 28, 38. Beams 28, 38 return along the opposite direction of beams 27, 26, 25, 24, 23, 22 and 37, 36, 35, 34, 33, 32, 31 to become beams 29, 39. The two returned beams 29, 39 are combined in the cube beam splitter 11 to become beam 40. A detector system 14 is positioned in the path of beam 40 to detect the interference fringes.

In use, the components of the cube beam splitter 11, the reflector 12, two first triangular prisms 15, 16 and the detector system 14 can be integrated into a fixed component 93 and mounted on a fixed base. The two second prisms 17, 18 can be integrated into a single movable component 94 and mounted on the object to be measured in a manner similar to the first embodiment. It should also be noted that the two first prisms 15, 16 could be integrated to form a single prism.

A movement along the Y axis will cause an equal change in the optical path length between two measuring arms. But a transverse movement along the X axis will increase the path length in one measuring arm and at the same time decrease the path length in the other measuring arm. Therefore, the interference fringes are produced by the optical path lengths difference of the two measuring beams as the relative transverse movements take place. The detector system produces signals in known manner from the interference fringes.

When the movable component 94 moves along the Y axis, the transverse movement or the straightness error in the X axis will be checked. The movement or the straightness in the axis Z can also be checked by turning the components 93 and 94 at a 90° angle. It will be apparent that a structure with both arrangements of the components can be used to measure the vertical straightness and horizontal straightness simultaneously.

Figure 10:
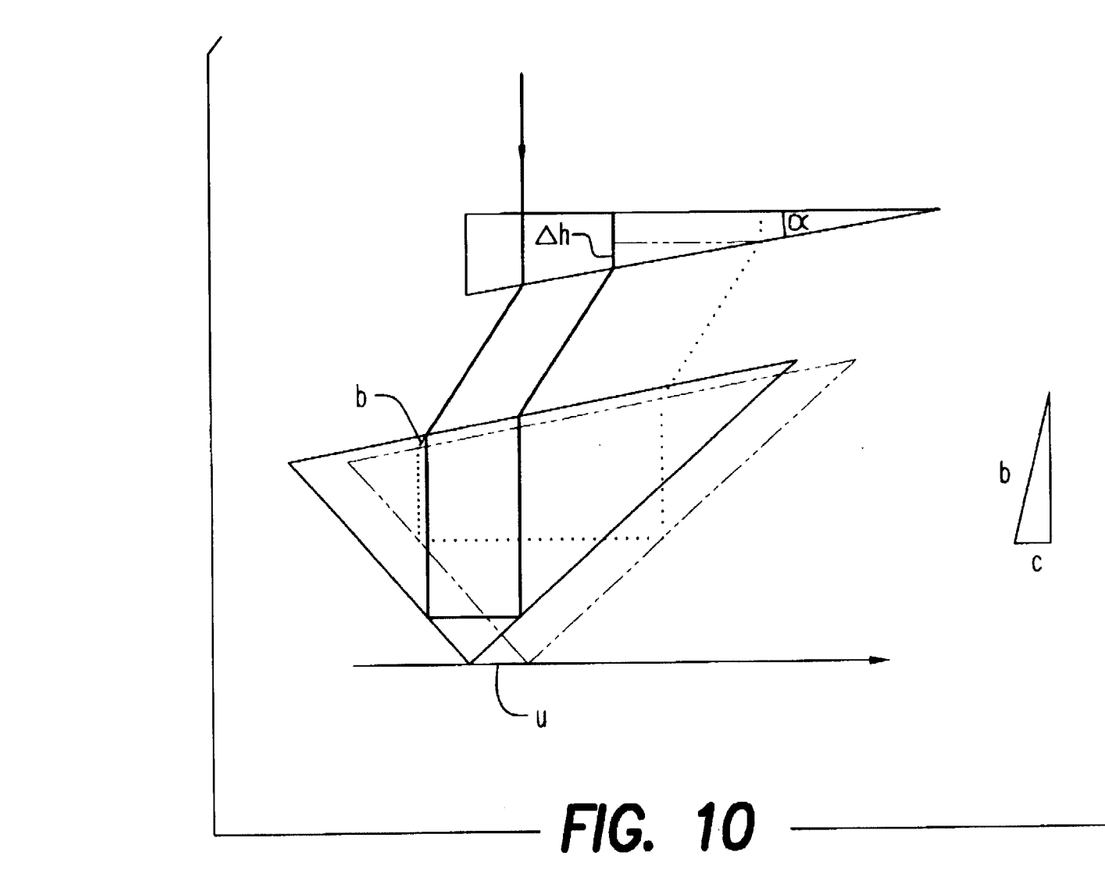
FIG. 10 is a view of one arm of the optical path arrangement in FIG. 9 for calculating the optical path length change caused by a relative transverse displacement between the two triangular prisms.

FIG. 10 shows one arm of the optical path arrangement in FIG. 9 for calculating the optical path length change caused by a relative transverse displacement between the fixed component 93 and the movable component 94. The second prism is moved along the X axis by a small distance x, which causes the optical path length to change by a distance b in the air and a height difference $\Delta h$ in the first triangular prism. The relation between the transverse motion x and the optical path length change $\Delta$ can be derived as follows:

$$b = x \sin\alpha / \sin\beta \qquad (9)$$

$$c = b\cos(\alpha+\beta) \qquad (10)$$

$$\Delta h = 2(x-c) \tan\alpha \qquad (11)$$

$$\Delta = 2(n\Delta h - 2b) = 4 \, n \, x \, \tan\alpha \, [1 - \sin\alpha \, \cos(\alpha+\beta)/\sin\beta] - 4x\sin\alpha/\sin\beta. \qquad (12)$$

Because we use a differential detection method, the optical path lengths difference between the two measuring beams will be $2\Delta$.

The maximum measurement range $X_{max}$ is determined by the following equation:

$$X_{max} = h/2[1-\sin\alpha \, \cos(\alpha+\beta)/\sin\beta]. \qquad (13)$$

For a small angle of $\alpha$, the equation (12) and (13) can be approximately simplified as $$\Delta = 4 \, (n-1) \, u \, \sin\alpha \qquad (14)$$

and $$U_{max} = h/2 \qquad (15)$$

An appropriate refractive index and angle for the prisms can be chosen optimally to ensure a reasonable measuring resolution and range for the interferometer.

According to equations (12) and (13), for $\alpha=15°$, and $n=1.65$, the optical path length change $\Delta$ caused by the relative transverse displacement x can be expressed by: $\Delta=0.533x$ and $X_{max}=h/2.1$.

The advantage of using this embodiment is that the optical path length differences caused by the transverse movement of the movable component are doubled. In addition the measuring results are less sensitive to variations in the environment, thus a high accuracy can be achieved.

Figure 11:
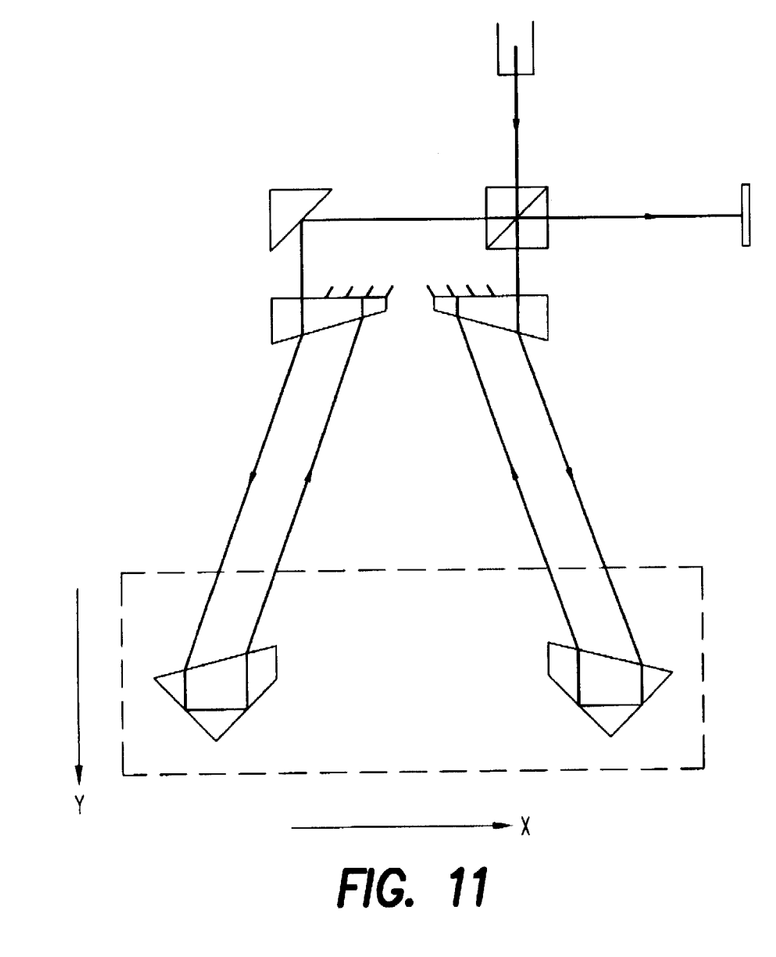
FIG. 11 is a diagrammatic view of an alternative embodiment of the invention.

FIG. 11 shows an alternative embodiment of the invention with a divergence deviated angle with respect to the principal axis such that the measuring arms diverge between the first and second prisms.

Figure 12:
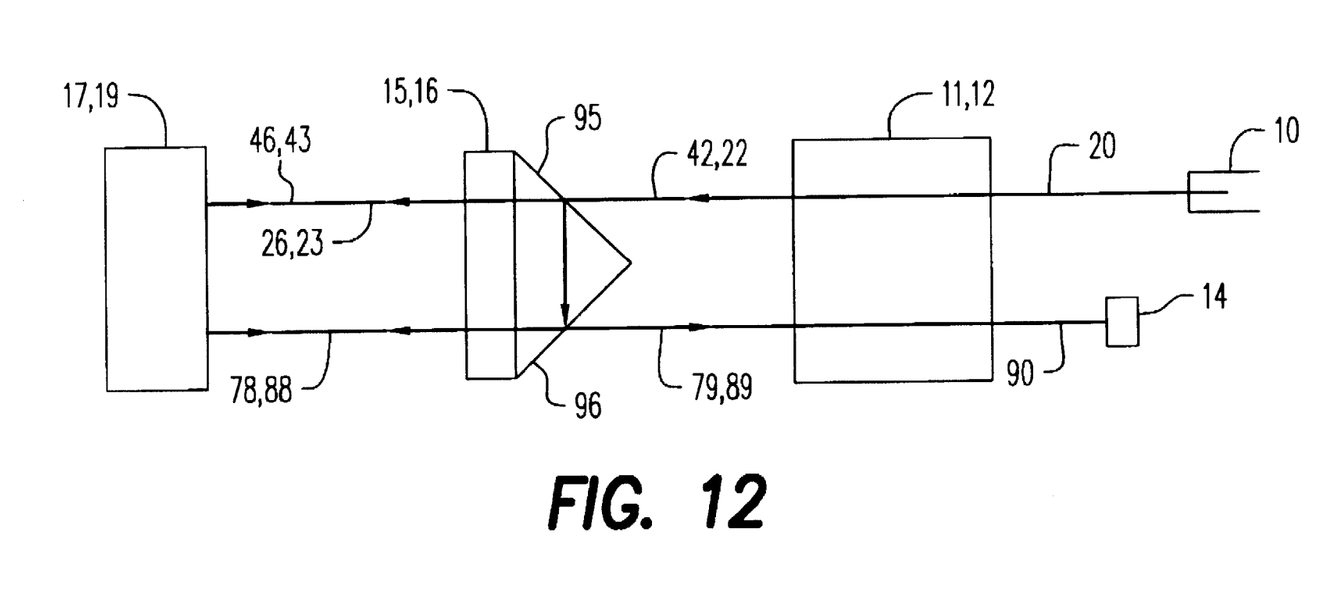
FIG. 12 is a diagrammatic view of the straightness interferometer system of one embodiment of the invention using a corner prism to replace the reflection surface of the first triangular prism.

In a further embodiment, a corner prism may be arranged behind the first triangular prism to replace the reflection surface and provide a deviated returning beam.

FIG. 12 shows a side view of this embodiment. The beams 27, 37 come along the paths 20, 22, 23, 24, 25, 26 and 31, 32, 33, 34, 35, 36 as shown in FIG. 2. The corner prisms 95, 96 reflect the beams 27, 37 to become beams 78, 88 which are displaced by a distance d from the beams 27, 37 along the third orthogonal axis Z. The beams 78, 88 return along the opposite direction of the beams 27, 26, 25, 24, 23, 22 and 37, 36, 35, 34, 33, 32, 31 by a deviated distance d to become beams 79, 89. The two beams 79, 89 are combined in the cube beam splitter 11 to become beam 90. In this case, the detector system 14 may be positioned in the path of beam 90 the same distance d below the laser. The advantage of this embodiment is that the returning combined beam does not interfere with the original laser beam 20.

The applications of the system are mainly in the fields of metrology, control, alignment techniques, precision engineering and manufacturing. Aside from measuring straightness, the new method is also suitable for high accuracy transverse vibration monitoring and for servo control systems.

We claim:

1. A laser interferometer system for detecting movement perpendicular to a principal axis, comprising:

a frequency stabilized laser source for producing a laser beam along said principal axis;

a first component including, beam splitting means for producing two measuring arms, reflecting means for reflecting one of said measuring arms such that said measuring arms are parallel, and a pair of first prisms located respectively in the optical paths of said measuring arms and comprising refractive surfaces and reflection surfaces, said refractive surfaces causing said measuring arms to be refracted from said principal axis;

a second component including a pair of prism reflectors located respectively in the optical paths of said measuring arms, at least one of said prism reflectors including a refraction surface arranged such that upon traverse movement of said second component in a direction normal to said principal axis arms an optical path length change is introduced into the measuring arm incident on said at least one prism reflector, said prism reflectors directing said measuring arms back to said reflection surfaces of said first prisms whereupon said measuring arms are reversed and recombined in said beam splitting means into a combined beam carrying information relating to the optical path difference between said two measuring arms introduced by said refraction surface; and detection means for receiving said re-combined beam.

2. An interferometer system as claimed in claim 1 wherein a first of said prism reflectors comprises reflection surfaces only and the second of said prism reflectors comprises said at least one refractive surface.

3. An interferometer system as claimed in claim 1 wherein after passing through said first prisms said measuring arms are parallel.

4. An interferometer system as claimed in claim 1 wherein said fit prisms include refractive surfaces, said refractive surfaces being so arranged as to refract said measuring arms in opposite senses.

5. An interferometer system as claimed in claim 4 wherein after passing through said first prisms said measuring arms are arranged to converge towards said second component.

6. An interferometer system as claimed in claim 4 wherein after passing through said first prisms said measuring arms are arranged to diverge towards said second component.

7. An interferometer system as claimed in claim 1 wherein said first component includes a pair of retroreflectors located behind the first prisms for reflecting the measuring arms to form return beams in a plane parallel to the incident measuring arms but spaced therefrom.

8. An interferometer system as claimed in claim 1 wherein said first and second components are formed respectively as integrated units.

9. An interferometer system as claimed in claim 1 wherein said first component is fixed and said second component is movable.

10. A laser interferometer system for detecting movement perpendicular to a principal axis, comprising:

a frequency stabilized laser source for producing a laser beam along said principal axis;

a first component including beam splitting means for producing two measuring arms, reflecting means for reflecting one of said measuring arms such that said measuring arms are parallel, and a pair of first triangular prisms located respectively in the optical paths of said measuring arms and comprising refractive surfaces and reflection surfaces and arranged to refract said measuring arms by identical amounts such that said measuring arms remain parallel;

a second component including a reflection means located in one of said measuring arms and a prism reflector including a refractive surface located in the other of said measuring arms arranged such that upon transverse movement of said second component in a direction normal to said principal axis an optical path length difference is introduced into the measuring arm incident on said prism reflector, said reflection means and said prism reflector directing said measuring arms back to said reflection surfaces of said first triangular prisms whereupon said measuring arms are reversed and recombined in said beam splitting means into a combined beam carrying information relating to the optical path difference between said two measuring arms introduced by said refraction surface of said prism reflector.

11. An interferometer system as claimed in claim 10 wherein each said first triangular prism comprises a plane reflection coating surface on its top right angle face.

12. An interferometer system as claimed in claim 10 wherein one of said prism reflectors comprises two reflection coating surfaces on both of its right angle faces so as to form a retroreflector.

13. An interferometer system as claimed in claim 10 wherein one of the oblique angles of each said prism reflector is equal to the sum of the oblique angle of the first prism and 45°.

14. An interferometer system as claimed in claim 10 wherein said first prisms and said prism reflectors are orientated so that their hypotenuse surfaces are parallel to each other.

15. An interferometer system as claimed in claim 10 wherein said refraction surfaces have equal angles relative to said principal axis.

16. A laser interferometer system for detecting movement perpendicular to a principal axis, comprising:

a frequency stabilized laser source for producing a laser beam along said principal axis;

a first component including beam splitting means for producing two measuring arms, reflecting means for reflecting one of said measuring arms such that said measuring arms are parallel, and a pair of first triangular prisms located respectively in the optical paths of said measuring arms and comprising refractive surfaces and reflection surfaces and wherein said first triangular prisms are arranged so as to cause said measuring arms to converge after passing therethrough;

a second component including a pair of prism reflectors located respectively in the optical paths of said measuring arms and each said prism reflector including a refraction surface arranged such that upon transverse movement of said second component in a direction normal to said principal axis an optical path length change is introduced into the measuring arms, said prism reflectors directing said measuring arms back to said reflection surfaces of said first triangular prisms whereupon said measuring arms are reversed and recombined in said beam splitting means into a combined beam carrying information relating to the optical path difference between said two measuring arms introduced by said refraction surfaces; and detection means for receiving said re-combined beam.

17. An interferometer system as claimed in claim 16 wherein each first triangular prism comprises a plane reflection coating surface on its top right angle face.

18. An interferometer system as claimed in claim 16 wherein one of said prism reflectors comprises two reflection coating surfaces on both of its right angle faces so as to form a retroreflector.

19. An interferometer system as claimed in claim 16 wherein one of the oblique angles of each said prism reflector is equal to the sum of the oblique angle of the first triangular prism and 45°.

20. An interferometer system as claimed in claim 16 wherein said first triangular prisms and said prism reflectors are orientated so that their hypotenuse surfaces are parallel to each other.

21. An interferometer system as claimed in claim 16 wherein said refraction surfaces have equal angles relative to said principal axis.

22. A laser interferometer system for detecting movement perpendicular to a principal axis, comprising:

a frequency stabilized laser source for producing a laser beam along said principal axis;

a first component including, beam splitting means for producing two measuring arms, reflecting means for reflecting one of said measuring arms such that said measuring arms are parallel, and a pair of first triangular prisms located respectively in the optical paths of said measuring arms and comprising refractive surfaces and reflective surfaces and wherein said first triangular prisms are arranged so as to cause said measuring arms to diverge after passing therethrough;

a second component including a pair of prism reflectors located respectively in the optical paths of said measuring arms and each said prism reflector including a refraction surface arranged such that upon transverse movement of said second component in a direction normal to said principal axis an optical path length change is introduced into the measuring arms, said prism reflectors directing said measuring arms back to said reflection surfaces of said first triangular prisms whereupon said measuring arms are reversed and recombined in said beam splitting means into a combined beam carrying information relating to the optical path difference between said two measuring arms introduced by said refraction surfaces; and detection means for receiving said re-combined beam.

23. An interferometer system as claimed in claim 22 wherein one of said prism reflectors comprises two reflection coating surfaces on both of its right angle faces so as to form a retroreflector.

24. An interferometer system as claimed in claim 22 wherein one of the oblique angles of each said prism reflector is equal to the sum of the oblique angle of the first triangular prism and 45°.

25. An interferometer system as claimed in claim 22 wherein said first triangular prisms and said prism reflectors are orientated so that their hypotenuse surfaces are parallel to each other.

26. An interferometer system as claimed in claim 22 wherein said refraction surfaces have equal angles relative to said principal axis.

27. A laser interferometer system for detecting movement perpendicular to a principal axis, comprising:

a frequency stabilized laser source for producing a laser beam along said principal axis;

means for splitting said laser beam into two measuring arms, one said arm being along said principal axis and the other said arm being parallel thereto;

means for introducing an optical path difference between said measuring arms upon movement of said optical path difference introducing means with a component perpendicular to said measuring arms;

means for recombining said measuring arms into a combined beam; and detection means for receiving said recombined beam.

* * * * *